(No Model.)
C. G. FRASH.
APPARATUS FOR TREATING WINE AND OTHER LIQUIDS.
No. 285,607. Patented Sept. 25, 1883.
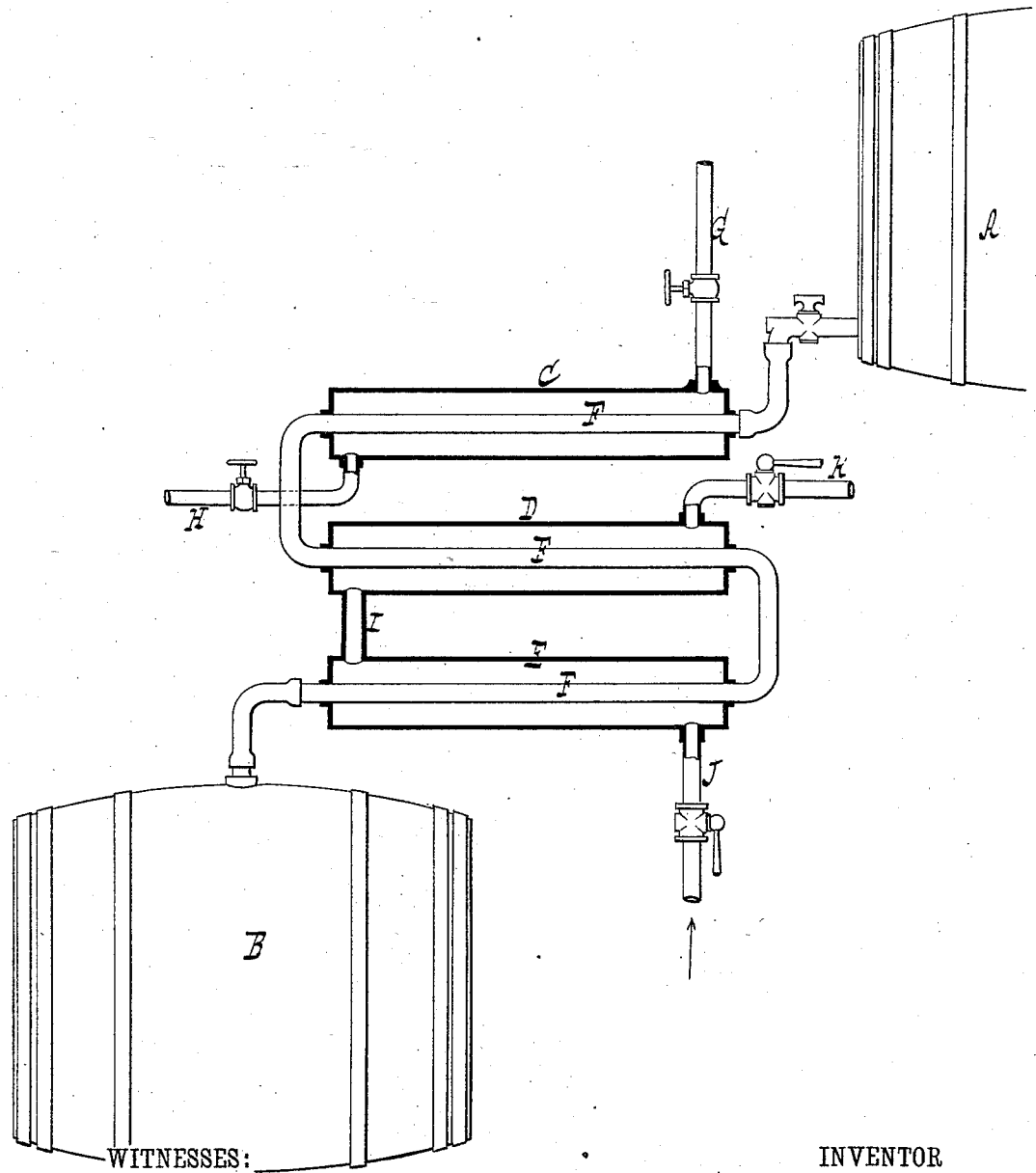

UNITED STATES PATENT OFFICE.

CHRISTIAN G. FRASH, OF BROOKLYN, NEW YORK.

APPARATUS FOR TREATING WINE AND OTHER LIQUIDS.

SPECIFICATION forming part of Letters Patent No. 285,607, dated September 25, 1883.

Application filed February 2, 1883. (No model.)

*To all whom it may concern:*

Be it known that I, CHRISTIAN G. FRASH, a citizen of the United States, residing at Brooklyn, in the county of Kings and State of New York, have invented new and useful Improvements in Apparatus for Treating Wine and other Liquids, of which the following is a specification.

This invention consists in the combination of a heating-drum and two or more cooling-drums, a pipe leading from the supply-vessel to the receiving-vessel and passing through all the drums, a steam-supply pipe connecting with the heating-drum, a pipe for carrying off the condensed water from the heating-drum, a cold-water pipe connected to the last cooling-drum, a connection between this drum and the remaining cooling drum or drums, and a discharge-pipe for the cold water, so that the liquid in its passage through the heating-drum is heated to a temperature sufficiently high to destroy the germs of fermentation contained in the same, and in its passage through the cooling-drums its temperature is reduced to such a degree that the same on reaching the receiving-vessel will not be liable to undergo any further change in its condition.

My apparatus is illustrated in the accompanying drawing, which represents a sectional side view of the same.

In this drawing, the letter A designates the supply-vessel. B is the receiving-vessel. C is the heating-drum, and D E are the cooling-drums.

From the supply-vessel the liquid is discharged into a pipe, F, which extends through all the drums C D E and leads into the receiving-vessel, as shown. The pipe F, or, at least, those portions of the same which are inclosed in the drums C D E, are made of metal, so that the liquid passing through the same will be readily brought to the temperature of the surrounding medium.

G is a steam-supply pipe, which leads into the top of the heating-drum, and from the bottom of this drum extends a pipe, H, which serves to carry off the condensed water and the waste steam, said pipe being provided with a stop-cock or other equivalent device for regulating the escape of steam and water, according to the temperature to which the liquid passing through the drum C is to be heated.

The drum E communicates by a pipe, I, with the drum D, and by a pipe, J, with a reservoir containing water, and placed at such a level above my apparatus that when the stop-cock in the pipe J is opened the water is under a sufficient pressure to pass through the cooling-drums E D and out through a pipe, K, emanating from the drum D.

By referring to the drawing it will be seen that the pipes J, I, and K are placed in such relation to each other and to the drums D E that the water admitted through the pipe J has to circulate through both the drums E D before it reaches the discharge-pipe K. By passing a continuous stream of cold water through the drums E and D the liquid flowing through the pipe F becomes cooled before it reaches the receiving-vessel B; and it will be readily understood that by increasing the number of cooling-drums the temperature of the liquid passing through the pipe F can be brought down to a point equal, or nearly so, to the temperature of the water or other cooling medium introduced through the pipe J, and flowing in a direction opposite to that in which the wine or other fermented liquid flows through the pipe F.

My apparatus is intended particularly for treating fermented wine, in which case it is essential that the wine shall be heated to about 160° to 170° Fahrenheit for a short period of time, and then cooled immediately, before it enters the storing-vessel.

My apparatus may, however, be also used for cider, grape-juice, or other liquids containing germs of fermentation.

What I claim as new, and desire to secure by Letters Patent, is—

The combination, substantially as hereinbefore described, of the heating-drum and two or more cooling-drums, the pipe leading from the supply-vessel to the receiving-vessel and passing through all the drums, the steam-supply pipe connecting with the heating-drum, the pipe for carrying off the condensed water and waste-steam from the heating-drum, the cold-water pipe connected to the last cooling-drum, the connection between this drum and the remaining cooling drum or drums, and the discharge-pipe for the water.

In testimony whereof I have hereunto set my hand in the presence of two subscribing witnesses.

CHRISTIAN G. FRASH.

Witnesses:
W. HAUFF,
D. VAN SANTVOORD.